United States Patent [19]

Hartmann

[11] Patent Number: 4,581,191
[45] Date of Patent: Apr. 8, 1986

[54] METHOD FOR THE PRODUCTION OF MOLDED ARTICLES FROM POLYLAUROLACTAM, AS WELL AS THE RESULTING MOLDED ARTICLES

[76] Inventor: Werner Hartmann, Fischerstr. 34, Konstanz, Fed. Rep. of Germany, 7750

[21] Appl. No.: 585,184

[22] Filed: Mar. 1, 1984

[51] Int. Cl.$^4$ .............................................. B29C 33/64
[52] U.S. Cl. ................................ 264/143; 264/328.6; 264/328.17; 264/331.19; 524/265
[58] Field of Search ........... 264/328.6, 328.17, 331.11, 264/331.19, DIG. 56, DIG. 61, 143, 211; 524/265

[56] References Cited

U.S. PATENT DOCUMENTS 3,637,604  1/1972  Schneider et al. .................. 524/265

FOREIGN PATENT DOCUMENTS 2096047  10/1982  United Kingdom .

Primary Examiner—Donald Czaja
Assistant Examiner—V. Fischbach
Attorney, Agent, or Firm—Bruce K. Thomas

[57] ABSTRACT

A polylaurolactam mold is being produced by that a laurolactam melting at first is being mixed with a catalyst and the mixture afterwards being compounded with an activator and polymerized, whereby the polymerizing material is being cast to threads or cords and the reduced material is being injection molded at temperatures of 430° F. to 490° F. and at pressures of $50.10^5$ to $100.10^5$ Pa, whereby, according to the invention, before the molding 0.1 to 5 wt. % silicon fat is added to the granules. The then resulting molded products, especially protective helmets and protective plates, are distinguished by superior physical properties.

10 Claims, No Drawings

METHOD FOR THE PRODUCTION OF MOLDED ARTICLES FROM POLYLAUROLACTAM, AS WELL AS THE RESULTING MOLDED ARTICLES

The invention concerns a method for the production of molded articles from polylaurolactam, as well as the resulting molded articles, especially in the shape of protective helmets and protective plates.

In a prior proposal according to German patent application No. P31 14 217.6 molded articles from polylaurolactam are produced by a method in which laurolactam is melted, the melting at first is mixed with a catalyst and the mixture is afterwards compounded with an activator and polymerized, whereby the polymerizing material is cast to filaments or strands and subsequently reduced to granules, and the reduced material is injection molded at temperatures of from 430° to 490° F. and pressures from $50.10^5$ to $100.10^5$ Pa. The polylaurolactam molded articles obtained by this method possess good chemical and physical properties. However, at extraordinary stresses of such molded articles, especially at heavy impact stresses, e.g. in fire or bombardments, difficulties may be encountered. For instance, at shelling or bombardment of these generally known molded articles with bullets of 5.56 mm and a weight of 0.7 g cobweb-like tears result at the point of impact, whereby the penetration strength will be less and splintering is the consequence.

The invention is based on the task of developing a method of the above mentioned nature in such a way that the obtained polylaurolactam molded articles show improved physical properties, especailly higher notched impact strength and penetration strength or penetration resistance.

In accordance with the invention this task will be solved by a method for the production of molded articles of polylaurolactam in which a laurolactam melting at first is mixed with a catalyst and the mixture is subsequently compounded with an activator and polymerized, whereby the polymerizing material is cast to filaments or strands and thereafter reduced to granules and the reduced material is injection molded at temperatures of from 430° to 490° F. and pressures of from $50.10^5$ to $100.10^5$ Pa characterized by that before the molding 0.1 to 5 wt. % of silicone grease is added to the granules.

Additive amounts of from 0.5 to 1 wt. % of silicone grease proved to be especially suitable.

Especially suitable as silicone greases are those which as the consistency component contain soaps. Phenylmethyl silicone oil thickened with soaps is particularly preferred as a silicone grease additive.

Appropriately, the addition of the silicone grease takes place in such a way that the silicone grease at first is mixed with polylaurolactam reduced to powder and this mixture is added to the polylaurolactam granules.

A further object of the invention consists of molded articles from polylaurolactam which were produced according to the above method.

Protective helmets and protective plates are especially preferred molded articles according to the invention.

As the starting material for performing the method of the invention the polylaurolactam obtained according to DE-OS Nos. 2 507 549 or DE-OS 2 559 749 is used which after the prior proposal of the German patent application No. P 3114217.6 will be treated further.

For the production of the starting material, laurolactam is initially melted and the catalyst is mixed in with this melting. After thorough mixing, the activator, if desired mixed with a partial amount of the laurolactam melting, is added to the mixture. The usual catalysts and activators are used, whereby especially sodium, alkalilactams, anhydrous ethanol and carbon dioxide, as well as preferably sodium amide are used as catalysts and substituted lactams, for example N-aryllactams and N-cyanolactams, substituted ureas and reaction products of carbamic acid chloride with heterocyclic compounds, such as imidazole and preferably isocyanate, are used as activators. The addition of the catalysts to the laurolactam melting, the following admixture of the activator and the polymerization preferably take place at a constant temperature, suitably within the range of 300° to 390° F., whereby a temperature of 320° F. proved to be maximum.

One may also proceed in accordance with DE-OS No. 2 559 74by feeding equivalent amounts of laurolactam into two separate vessels and melting them while stirring. While maintaining a temperature below 340° F. and above 320° F. a catalyst is supplied to one vessel and stirred. Chronologically delayed with regard to this procedure so a separate vessel containing an equivalent amount of lactam melting, while stirring an activator is added at a temperature which is some °F. lower than that of the first melting, however likewise within the range of below 340° F. to above 320° F. While maintaining their temperatures the two container contents then are respectively removed, withdrawn from their vessels by a gear pump and led by the two gear pumps via pipelines with a maximum inclination to the horizontal of 50° F., to a mixing zone, the pipelines having at least a one third larger volume dimensioning than what is consistent with the delivery of the pump. In the mixing zone the material is briefly mixed, whereby the appearing gases are led back into the mixing vessel via gear pumps.

The polymerizing materials, obtained in accordance with the above methods, are directly cast to filaments or strands. For this procedure the filament casting unit for example as indicated in DE-PS No. 2 602 312 may be used. The filaments or strands are then reduced to granules or to chips. For example, the filaments or strands may in the first place be processed by rolls to ribbons which afterwards are cut into strips and finally reduced to granules. For the reduction of the polymerizate, common mills or granulating machines may be used.

The granules may show any arbitrary, regular or irregular shapes. As an example, the granules used have a rectangular, particularly a square, cross section. Peferably, the granules used have an average particle diameter of from 2 to 5 mm. Cube shaped granules with edge lengths of 3 mm proved to be especially favorable.

Such polylaurolactam granules are then, in accordance with the invention, injection molded with the addition of silicone grease in an amount of 0.1 to 5 wt. %, while using temperatures of from 430° to 490° F. and pressures of from $50.10^5$ to $100.10^5$ Pa. The molding procedure may be carried out in usual injection molding machines with heated extruder screws and nozzles. Preferably the back region of the screw should be heated to 465° F., while the front region of the screw should be heated to 480° F. The nozzle heating is preferably at 480° F.

As silicone greases those are preferably used which contain soaps as the consistency component. Such silicone greases are formed of silicone oils to which as consistency component metal soaps are added. As silicone oils liquid organopolysiloxanes are suitable, especially dimethyl or phenylmethyl polysiloxanes such as linear organopolysiloxanes of the formula $$(R)_3SiO[-Si(R)_2-O-]_nSi(R)_3$$

where $R=CH_3$ and/or $C_6H_5$ and which compounds have a molecular weight of about 1000 to about 150,000. Likewise cyclic organopolysiloxanes of the formula $$[-Si(R)_2-O-]_n$$

where $n=4$ to 8 and $R=CH_3$, can be used. In addition ring halogenated phenylmethyl polysiloxanes are useful silicone oils. The consistency compound forming together with the silicone oil the silicone grease consists of metal soaps, especially alkaline metal soaps and/or alkaline earth metal soaps as well as aluminum metal soaps. Lithium or calcium metal soaps, especially lithium and calcium stearates are useful consistency compounds for the silicone greases on the basis of silicone oils. Preferably a silicone grease on the basis of phenylmethyl silicone oil thickened with lithium stearate is used as an additive to the polylaurolactam before its molding.

While the additive amount of silicone grease is generally between 0.1 and 5 wt. %, amounts of 0.2 to 3 wt. % are preferably used. Favorable results were in particular achieved with the addition of a silicone grease in an amount of 0.5 to 1 wt. %.

The addition of the silicone grease to the polylaurolactam granules may take place in any manner, provided that a good blending with the granules results. It turned out to be especially advantageous not to carry out the addition of the silicone grease directly to the granules, but to blend the silicone grease at first with powderized polylaurolactam and then add this mixture to the polylaurolactam granules. So, by mixing the silicone grease with smaller amounts of powderized polylaurolactam, it is at first converted in a pulverized form which is easier to handle and easier to mix which may then be mixed in a simple manner with the bulk of the polylaurolactam granules.

By this premixing of polylaurolactam powder with silicone grease to convert the silicone grease into a suitable additive form to the granules, the laurolactam polymer is used expediently in a very fine powderized form, especially in powder form, as for instance with a grain size below 10 um, preferably below 100 nm. After the silicone grease has been converted into a suitable additive form by blending with the polymer powder, the powder-shaped mixture may be blended with the polylaurolactam granules without any difficulty. The mixing procedure is carried out efficiently by tumbling the powder-shaped material onto the granules, in a drum.

The mixture of polylaurolactam and silicone grease is then molded into the appropriate molded article by injection molding, whereby the conditions for the molding procedure indicated above are to be observed.

The polylaurolactam molded articles obtained by the method of the invention are distinguished by outstanding qualities in which they are superior to known polylaurolactam materials.

While maintaining the favorable qualities of the polylaurolactam material obtained by the method of the prior application No. P 31 14 217.6, due to the present invention especially the notched impact strength and penetration strength of the material were improved. By the addition of silicone grease to the polylaurolactam granules before molding, it has been achieved that under impact and shock stress a splintering or shattering of the molded product does not occur anymore, but a scaling similar to what happens with mica results.

As it were, layers are formed, whereby they, since lying one beneath the other, increase the penetration strength of the molded product. Furthermore, the molded articles according to this invention are distinguished by extremely low heat conductivity.

The molded articles of the invention find versatile application due to their outstanding qualities.

A preferred embodiment of the invention consists in the formation of the molded articles into protective helmets and protective plates.

Both protective helmets and protective plates have to withstand high mechanical stresses. Especially high demands are made to the impact resistance and penetration strength of such molded products. The molded products of the invention in the form of a protective helmet or a protective plate respectively, above all show outstanding values at the ballistic test. The penetration strength of such molded products showed outstanding values under fire or shelling, which were lying far above those of well-known helmet materials or protective plate materials respectively. Due to the addition of silicone grease to the polylaurolactam material at the injection molding of the products there is no splintering under fire, but a scaling like mica without any loss in strength.

In the following, the invention is illustrated by examples.

EXAMPLE 1

According to the method described in DE-OS No. 2 507 549 a polymerization product is produced from a laurolactam melting with the addition of sodium amide as catalyst and subsequent addition of phenyl isocyanate as an activator. This product is led in the polymerizing condition, at temperatures of 320° F. to 335° F., to a filament casting unit, from where the polymerization product emerges as a filamentary material and is then reduced to granules of a grain size of 3 to 4 mm.

In accordance with the invention, the polylaurolactam granules are blended with 0.8 wt. % of a silicone grease thickened with lithium soaps. After thorough blending the polylaurolactam granules compounded with the silicone grease are supplied to an injection molding machine and there they are injection molded into the shape of a protective helmet using heated extruder screws and heated nozzles at a temperature of 465° F. in the back region of the screw, and at 480° F. in the front region of the screw, at a pressure of $80.10^5$ Pa.

The molded article obtained is distinguished by extraordinary mechanical and thermal properties, especially by high impact strength and penetration strength.

EXAMPLE 2

According to the method described in DE-OS No. 2559749 a polymerization mixture is produced from a laurolactam melting compounded with sodium amide as the catalyst by delayed addition of an equivalent amount of a laurolactam melting compounded with sodium amide as the catalyst by delayed addition of an equivalent amount of a laurolactam melting compounded with phenyl isocyanate as the activator, at temperatures within the range of 320° F. to 340° F., whereby the gases appearing in the mixing zone are withdrawn via a gear pump. The polymerizing material is immediately cast to filaments and subsequently granulated to an average particle diameter of 3 to 4 mm.

According to the invention, the silicone grease which is to be added at first is converted by mixing with polylaurolactam powder into a form which may easily be distributed in the polylaurolactam granules. For this purpose a small amount of polylaurolactam granules is reduced to a powder having an average particle diameter of below 10 um. To this powder while mixing 0.7 wt. % of silicone grease with stearate soap as consistency component, based on the total amount of polylaurolactam to be injection molded, are added. The polylaurolactam powder containing silicone grease, is then tumbled in a drum onto the polylaurolactam granules.

The polylaurolactam granules compounded in the above manner with silicone grease are injection molded into the shape of protective helmets in an injection molding machine, at temperatures of 445° F. in the back region of the screw and 475° F. in the front region of the screw as well as in the nozzle and the molded articles excelled by outstanding physical qualities, especially high penetration strength and impact strength.

The molded articles produced in accordance with the method of Example 2 in the form of protective helmets, were subjected to a ballistic test. The performance under fire with a bullet of 5.56 mm and a weight of 1.7 g is quoted on the following Table together with values for other known types of military helmets.

The results of the Table show clearly that the polylaurolactam helmets, in accordance with the invention, have a far superior penetration strength over the known helmets. Beyond that, the very low weight of the helmet of the invention, has also a very favorable effect, since this helmet of the invention has approximately half the weight of the Aramid helmet being at present the most favorable with regard to its penetration strength.

ized whereby the polymerizing material is being cast to filaments or strands subsequently reduced to granules and the reduced material is being injection molded at temperatures of from 430° to 490° F. and pressures of from $50.10^5$ to $100.10^5$ Pa, characterized by that before the molding 0.1 to 5 weight % of silicone grease is added to the granules.

2. Method in accordance with claim 1, characterized by that the addition of silicone grease is performed in such a way that the silicone grease in the first place is mixed with polylaurolactam reduced to a powder, and this mixture then being added to the polylaurolactam granules.

3. Method in accordance with claim 1 or 2, characterized by the silicone grease being added in an amount of from 0.5 to 1 weight %.

4. Method in accordance with claims 1, 2 or 3, characterized by that a silicone grease is used containing soaps as the consistency component.

5. Method in accordance with claims 1, 2, 3 or 4, characterized by that as the silicone grease phenylmethyl silicone oil thickened with soaps is being used.

6. Molded article from polylaurolactam which has been produced by at first mixing a laurin lactam melting with a catalyst and the mixture afterwards being compounded with an activator and polymerized, whereby the polymerizing material is being cast to filaments or strands and subsequently reduced to granules and the reduced material is injection molded at temperatures of from 430° to 490° F. and pressures of from $50.10^5$ to $100.10^5$ Pa, characterized by that during the preparation of the polylaurolactam before the molding 0.1 to 5 wt. % of silicone grease has been added to the granules.

7. Molded article in accordance with claim 6, characterized by that at its production and before the molding 0.1 to 5 wt. % of silicone grease was added to the polylaurolactam granules.

8. Molded articles in accordance with claim 6 or 7, characterized by that at its production and before the molding, silicone grease, thickened with soaps, was added to the polylaurolactam granules.

9. Molded article in accordance with claims 6, 7 or 8

TABLE I

| Helmet Type | Weight (kg) | Maximum kenetic energy without penetration | | Kenetic energy two penetrations | | Minimum kenetic energy with one penetration | |
|---|---|---|---|---|---|---|---|
| | | (J) | $V_o$ (m/s) | (J) | $V_o$ (m/s) | (J) | $V_o$ (m/s) |
| American fibre, Aramid | 1,682 | 89 | 504 | 202 | 760 | 84 | 490 |
| S.A. Steel & Nylon | 1,479 | 71 | 450 | 93 | 516 | 76 | 467 |
| Israeli Steel, Haargaz | 1,467 | 79 | 476 | 133 | 617 | 84 | 490 |
| Israeli fibre, Orlite | 1,329 | 79 | 476 | 144 | 641 | 86 | 495 |
| British fibre | 1,256 | 81 | 481 | 113 | 568 | 86 | 495 |
| Indian fibre | 1,072 | 44 | 354 | 68 | 442 | 40 | 337 |
| Ballistic DM 609 A | 0,943 | 36 | 321 | 135 | 621 | 53 | 391 |
| S.A. fibre, white | 0,675 | 36 | 321 | 47 | 368 | 20 | 240 |
| Polycarbonate crash | 0,586 | 39 | 335 | 74 | 460 | 38 | 331 |
| S.A. fibre, blue | 0,499 | 22 | 250 | 28 | 281 | 19 | 235 |
| Polylaurolactam according to the invention | 0,884 | 630 | 1341 | — | — | — | — |
| Zytel ST | 0,960 | — | — | 62 | 421 | — | — |
| PA 6 (cond. 3.5% $H_2O$) | 0,905 | — | — | 52 | 385 | — | — |
| PA 66 | 0,904 | — | — | 49 | 374 | — | — |
| Grilamid TR 55 | 0,905 | — | — | 56 | 401 | — | — |
| Steel HV | 1,046 | — | — | 103 | 542 | — | — |

*With the polylaurolactam helmets according to the invention, an increase $V_o$ form 600 so 1341 m/s without penetration occurred, thereafter the test was stopped.

What is claimed is:

1. Method for the production of molded articles from polylaurolactam in which a laurin lactam melting is at first being mixed with a catalyst and the mixture is afterwards compounded with an activator and polymerin the shape of a protective helmet.

10. Molded article in accordance with claims 6, 7 or 8 the shape of a protective plate.

* * * * *